(12) United States Patent
Hur et al.

(10) Patent No.: US 12,580,659 B2
(45) Date of Patent: Mar. 17, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Jaemyung Hur, Suwon-si (KR); Minsup Kim, Suwon-si (KR); Kyoungshin Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 497 days.

(21) Appl. No.: 18/108,837

(22) Filed: Feb. 13, 2023

(65) Prior Publication Data

US 2023/0198623 A1 Jun. 22, 2023

Related U.S. Application Data

(63) Continuation of application No. PCT/KR2021/012392, filed on Sep. 13, 2021.

(30) Foreign Application Priority Data

Sep. 15, 2020 (KR) ........................ 10-2020-0118297

(51) Int. Cl.
H04B 10/11 (2013.01)
H04B 10/114 (2013.01)
(Continued)

(52) U.S. Cl.
CPC ......... H04B 10/40 (2013.01); H04B 10/1143 (2013.01); H04B 10/1149 (2013.01); G01S 17/04 (2020.01); H04B 10/11 (2013.01)

(58) Field of Classification Search
CPC ............... H04B 10/40; H04B 10/1143; H04B 10/1149; H04B 10/11; G01S 17/04;
(Continued)

(56) References Cited

U.S. PATENT DOCUMENTS

| | | | |
|---|---|---|---|
| 5,777,561 A | 7/1998 | Chieu et al. | |
| 6,369,880 B1 | 4/2002 | Steinlechner | |

(Continued)

FOREIGN PATENT DOCUMENTS

| | | | |
|---|---|---|---|
| DE | 10 2018 133 312 | 6/2020 | |
| JP | 07-072237 A | 3/1995 | |

(Continued)

OTHER PUBLICATIONS

Irlbacher et al., DE 102018133312 A1, Jun. 2020, Deutsches Patent—und Markenamt, All Document. (Year: 2020).*

(Continued)

*Primary Examiner* — Dibson J Sanchez
(74) *Attorney, Agent, or Firm* — NIXON & VANDERHYE P.C.

(57) ABSTRACT

An electronic apparatus is disclosed. The electronic apparatus includes: a communication interface comprising communication circuitry and a processor configured to: control the communication interface to transmit a signal of a first carrier frequency, and based on a signal generated as the signal of the first carrier frequency reflected by a space where the electronic apparatus is disposed not being received through the communication interface within a first threshold time after the signal of the first carrier frequency is transmitted, determine the first carrier frequency as a search carrier frequency; based on the reflected signal being received through the communication interface within the first threshold time after the signal of the first carrier frequency is transmitted, control the communication interface to transmit a signal of a second carrier frequency different from the first carrier frequency; control the communication interface to transmit a signal of the determined search carrier frequency; and identify whether an object is present based on whether a signal is received through the (Continued)

communication interface within a second threshold time after the signal of the search carrier frequency is transmitted.

15 Claims, 12 Drawing Sheets

(51) Int. Cl.
*H04B 10/40* (2013.01)
*G01S 17/04* (2020.01)
(58) Field of Classification Search
CPC . G01S 17/86; G01S 3/808; G06F 3/14; H04R 2410/00
USPC .................................. 398/118–131, 135–139
See application file for complete search history.

(56) References Cited

U.S. PATENT DOCUMENTS

| | | | |
|---|---|---|---|
| 6,370,260 B1 | 4/2002 | Pavlidis et al. | |
| 9,581,682 B2 | 2/2017 | Jeong et al. | |
| 10,816,657 B2 | 10/2020 | Kim | |
| 11,170,775 B2 | 11/2021 | Kim | |
| 11,378,647 B2 | 7/2022 | Cho et al. | |
| 2004/0169145 A1* | 9/2004 | Micko | G08B 29/183 |
| | | | 250/221 |
| 2007/0182554 A1* | 8/2007 | Elwell | G08B 13/1627 |
| | | | 340/567 |
| 2007/0274157 A1 | 11/2007 | Heimberger et al. | |
| 2008/0316026 A1* | 12/2008 | Yenisch | G01S 17/87 |
| | | | 340/555 |
| 2010/0109938 A1 | 5/2010 | Oswald et al. | |
| 2011/0304842 A1* | 12/2011 | Kao | G01S 7/4918 |
| | | | 356/5.01 |
| 2014/0012528 A1* | 1/2014 | Carmel-Veilleux | |
| | | | H03K 17/945 |
| | | | 702/92 |
| 2014/0062896 A1* | 3/2014 | Vieta | G06F 1/3231 |
| | | | 345/173 |
| 2015/0145764 A1* | 5/2015 | Hiromi | G06F 3/0304 |
| | | | 250/341.1 |
| 2015/0331090 A1 | 11/2015 | Jeong et al. | |
| 2016/0054440 A1 | 2/2016 | Younis | |
| 2016/0205236 A1 | 7/2016 | Alameh et al. | |
| 2017/0248697 A1 | 8/2017 | Lo | |
| 2017/0278516 A1* | 9/2017 | Choi | G10L 15/22 |
| 2018/0062769 A1 | 3/2018 | Kim | |
| 2018/0067196 A1 | 3/2018 | Irish et al. | |
| 2018/0252802 A1 | 9/2018 | Tong | |
| 2019/0179012 A1 | 6/2019 | Heo | |
| 2019/0371333 A1 | 12/2019 | Kim | |
| 2019/0377063 A1 | 12/2019 | Cho et al. | |
| 2020/0116817 A1 | 4/2020 | Chuo et al. | |
| 2021/0109214 A1* | 4/2021 | Hamlin | G01S 17/10 |
| 2021/0109486 A1* | 4/2021 | Hamlin | G05B 13/0265 |
| 2023/0288564 A1* | 9/2023 | Chung | G01S 7/4915 |

FOREIGN PATENT DOCUMENTS

| | | |
|---|---|---|
| KR | 10-0792140 | 1/2008 |
| KR | 10-1797792 | 11/2017 |
| KR | 10-2018-0025693 | 3/2018 |
| KR | 10-2018-0076814 | 7/2018 |
| KR | 10-2018-0088155 | 8/2018 |
| KR | 10-2019-0090746 | 8/2019 |
| KR | 10-2020-0040172 | 4/2020 |

OTHER PUBLICATIONS

Chinese Office Action issued Mar. 27, 2025 in corresponding Chinese Patent Application No. 202180062838.1.
Korean Office Action issued Apr. 8, 2025 in corresponding Korean Patent Application No. 10-2020-0118297.
International Search Report mailed Dec. 30, 2021 in PCT application PCT/KR2021/012392, 2 pages.
Written Opinion of the ISA mailed Dec. 30, 2021 in PCT/KR2021/012392, 3 pages.
Sony Support, "The TV turns off by itself or the picture turns black white the sound remains", Article ID: 00011744, Last modified Mar. 4, 2021, https://www.sony.ca/en/electronics/support/television-projectors-led-tvs-android-/xbr-55x950g/articles/00011743, 4 pages.
Extended European Search Report dated Nov. 24, 2023 issued in European Patent Application No. 21869645.8.
Fisher, "Vishay's TSSP4056 Sensor for Fast Proximity Sensing", issued Oct. 21, 2015, 9 pages.
Li, Yang et al., "Multimode Network Analysis for the Frequency Selective Characteristics of Dielectric Periodic Structures," ACTA Electronica Sinica, vol. 27, No. 3, Mar. 1999, 4 pp.
Chinese Notification of Due Registration Formalities dated Jul. 21, 2025 issued in Chinese Patent Application No. 202180062838.1 and English translation, 8 pp.

* cited by examiner

100

410

ELECTRONIC APPARATUS AND CONTROLLING METHOD THEREOF

CROSS-REFERENCE TO RELATED APPLICATIONS

This application is a continuation of International Application No. PCT/KR2021/012392 designating the United States, filed on Sep. 13, 2021, in the Korean Intellectual Property Receiving Office and claiming priority to Korean Patent Application No. 10-2020-0118297, filed on Sep. 15, 2020, in the Korean Intellectual Property Office, the disclosures of which are incorporated by reference herein in their entireties.

BACKGROUND

Field

The disclosure relates to an electronic apparatus and a controlling method thereof and, for example, to an electronic apparatus that identifies a user or a movement of a user and a controlling method thereof.

Description of Related Art

With the development of electronic technology, various types of electronic apparatuses are being developed and distributed. In particular, a recent electronic apparatus detects a user around the electronic apparatus and provides various functions based on whether the user is detected.

Here, the electronic apparatus may detect the user in various ways. For example, the electronic apparatus may detect a user using a sensor such as a Passive Infrared Ray (PIR) sensor. However, there is a problem in that the sensor cannot reflect the characteristics of the surrounding space because the operating radius and angle are preset. For example, the electronic apparatus may detect the user if the distance between the electronic apparatus and the user is within the operating radius of the sensor, but if the user is at a distance of 5 m or more from the electronic apparatus or in a space where the ceiling and one side of the wall are open, the electronic apparatus may not detect the user.

In addition, the electronic apparatus may detect a user using a camera. However, in this case, there could be a problem regarding power consumption according to the operation of the camera and use of resources for identifying the user from an image captured by the camera.

Accordingly, there is a need to develop a method for improving the accuracy of user detection while solving power consumption or resource problems.

SUMMARY

Embodiments of the disclosure provide an electronic apparatus that is easy to implement and may improve the accuracy of user detection without problems with power and resources and a controlling method thereof.

An electronic apparatus according to an example embodiment includes a communication interface comprising communication circuitry and a processor configured to: control the communication interface to transmit a signal of a first carrier frequency, and based on a signal generated based on the signal of the first carrier frequency being reflected by a space where the electronic apparatus is disposed not being received through the communication interface within a first threshold time after the signal of the first carrier frequency is transmitted, determine the first carrier frequency as a search carrier frequency; based on the reflected signal being received through the communication interface within the first threshold time after the signal of the first carrier frequency is transmitted, control the communication interface to transmit a signal of a second carrier frequency different from the first carrier frequency; control the communication interface to transmit a signal of the determined search carrier frequency, and identify whether an object is present based on whether a signal is received through the communication interface within a second threshold time after the signal of the search carrier frequency is transmitted.

The processor may be configured to, based on a signal being received within the second threshold time after the signal of the search carrier frequency is transmitted, identify that the object is present, and the received signal may be a signal that is generated as the signal of the search carrier frequency is reflected by the object.

The processor may be configured to identify that the object is present based on a difference between a carrier frequency of the reflected signal and the search carrier frequency is equal to or less than a threshold value.

The apparatus may further include a microphone, and the processor may be configured to, based on identifying that the object is present, turn on the microphone and identify that the object is a user based on sound received from the turned-on microphone.

The apparatus may further include a display, and the processor may be configured to, based on identifying the user while the electronic apparatus operates in a first mode, change the first mode to a second mode and control the display to display a UI corresponding to the second mode.

The first mode may be a power-off mode or a stand-by mode, and the second mode may be an ambient model.

The processor may be configured to control the communication interface to transmit the signal to the second carrier frequency based on a difference between a carrier frequency of the reflected signal and the first carrier frequency being equal to or less than a threshold value.

The processor may be configured to, based on identifying that the object is present, control the communication interface to transmit a signal of the search carrier frequency at a predetermined (e.g., specified) time interval.

The processor may be configured to, based on a signal not being received through the communication interface within the second threshold time after the signal of the search carrier frequency is transmitted at the predetermined time interval, identify that the object is not present and based on identifying that the object is not present, re-perform an operation of determining the search carrier frequency.

The communication interface may include an infrared ray (IR) transmitter and an IR receiver, and the processor may be configured to control the IR transmitter to transmit the signal of the first carrier frequency, and based on the reflected signal not being received through the IR receiver within the first threshold time after the signal of the first carrier frequency is transmitted, determine the first carrier frequency as the search carrier frequency; based on the reflected signal being received through the IR receiver within the first threshold time after the signal of the first carrier frequency is transmitted, control the IR transmitter to transmit a signal of a second carrier frequency different from the first carrier frequency; control the IR transmitter to transmit a signal of the determined search carrier frequency; and identify whether the object is present based on whether a signal is received through the IR receiver within the second threshold time after the signal of the search carrier frequency is transmitted.

A method of controlling an electronic apparatus according to an example embodiment includes: transmitting a signal of a first carrier frequency; based on a signal generated as the signal of the first carrier frequency being reflected by a space where the electronic apparatus is disposed not being received within a first threshold time after the signal of the first carrier frequency is transmitted, determining the first carrier frequency as a search carrier frequency; based on the reflected signal being received within the first threshold time after the signal of the first carrier frequency is transmitted, transmitting a signal of a second carrier frequency different from the first carrier frequency; transmitting a signal of the determined search carrier frequency; and identifying whether an object is present based on whether a signal is received within a second threshold time after the signal of the search carrier frequency is transmitted.

The identifying may include, based on a signal being received within the second threshold time after the signal of the search carrier frequency is transmitted, identifying that the object is present, and the received signal may be a signal generated as the signal of the search carrier frequency is reflected by the object.

The identifying may include identifying that the object is present based on a difference between a carrier frequency of the reflected signal and the search carrier frequency is equal to or less than a threshold value.

The method may further include, based on identifying that the object is present, turning on the microphone and identify that the object is a user based on sound received from the turned-on microphone.

The method may further include, based on identifying the user while the electronic apparatus operates in a first mode, changing the first mode to a second mode and displaying a UI corresponding to the second mode.

The first mode may be a power-off mode or a stand-by mode, and the second mode may be an ambient model.

The transmitting the signal of the second carrier frequency may include transmitting the signal to the second carrier frequency based on a difference between a carrier frequency of the reflected signal and the first carrier frequency being equal to or less than a threshold value.

The method may further include, based on identifying that the object is present, transmitting a signal of the search carrier frequency at a predetermined time interval.

The method may further include, based on a signal not being received through the communication interface within the second threshold time after the signal of the search carrier frequency is transmitted at the predetermined time interval, identifying that the object is not present and based on identifying that the object is not present, re-performing an operation of determining the search carrier frequency.

The transmitting the signal of the first carrier frequency may include transmitting a first IR signal of the first carrier frequency, the determining may include, based on a second IR signal that is generated as the first IR signal is reflected by a space where the electronic apparatus is disposed not being received within the first threshold time after the first IR signal is transmitted, determining the first carrier frequency as the search carrier frequency, the transmitting the signal of the second carrier frequency may include based on the second IR signal being received within the first threshold time after the first IR signal is transmitted, transmitting a third IR signal of the second carrier frequency that is different from the first carrier frequency, the transmitting the signal of the search carrier frequency may include transmitting a fourth IR signal of the search carrier frequency, and the identifying may include identifying whether the object is present based on whether a fifth IR signal is received within the second threshold time after the fourth IR signal of the search carrier frequency is transmitted.

According to various example embodiments described above, the electronic apparatus may adaptively detect a user with respect to the surrounding space of the electronic apparatus by changing the carrier frequency of a sensor.

In addition, when a user is detected by the sensor, the electronic apparatus may improve the accuracy of user detection by detecting the user through an auxiliary means such as a microphone.

Further, using a carrier frequency that can pass through an injection-molded object of the electronic apparatus, a sensor can be provided inside the electronic apparatus and thus, it can be implemented irrespective of the design of the electronic apparatus.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, the disclosure will be described in greater detail with reference to the accompanying drawings.

The terms used in the example embodiments of the disclosure are general terms which are widely used now and selected considering the functions of the disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, terms used in the disclosure may be defined based on a meaning of the terms and contents described in the disclosure, not simply based on names of the terms.

As used herein, the expression "have", "may have", "include", or "may include" refers to the existence of a corresponding feature (e.g., numeral, function, operation, or element such as component), and does not exclude one or more additional features.

The expression of "at least one of A and/or B" is to be understood as indicating any one of "A" or "B" or "A and B".

The expression "a first", "a second", "the first", or "the second" used in various example embodiments of the disclosure may refer to various components regardless of their order and/or the importance but does not limit the corresponding components.

A singular expression includes a plural expression as long as they are clearly distinguished in the context. In the application, it should be understood that the terms such as "comprising", "including" are intended to express that features, numbers, steps, operations, elements, part, or combinations thereof described in the disclosure are present and do not exclude existence or additions of one or more other features, numbers, steps, operations, elements, part, or combinations thereof.

In this disclosure, the term "user" may indicate a person who uses an electronic apparatus or a device (e.g., an artificial intelligence electronic device) that uses an electronic apparatus.

Various example embodiments of the disclosure will be described in greater detail with reference to the accompanying drawings.

Figure 1:
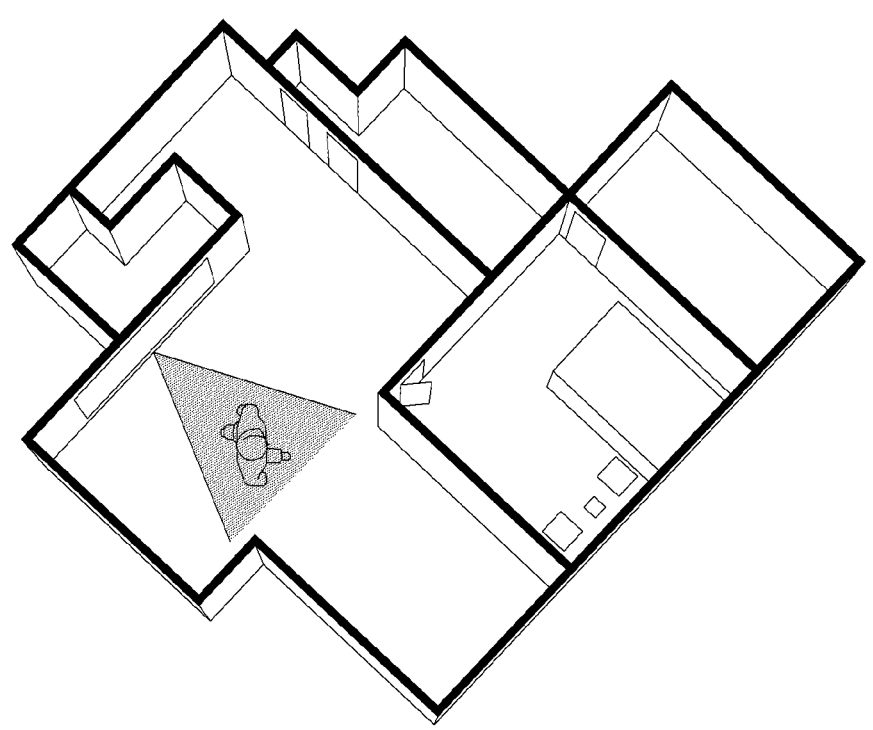
FIG. 1 is a diagram illustrating an example space where an electronic apparatus is disposed according to various embodiments.

FIG. 1 is a diagram illustrating an example space where an electronic apparatus is disposed according to various embodiments.

The electronic apparatus may be an apparatus that is disposed in a specific space to detect the presence of an object. For example, as illustrated in FIG. 1, the electronic apparatus may be implemented as a TV to detect the presence of a user. However, the electronic apparatus is not limited thereto, and the electronic apparatus may be any apparatus capable of detecting the presence of an object.

The electronic apparatus may adaptively detect the presence of an object according to the characteristics of the space where the electronic apparatus is disposed. For example, the electronic apparatus may operate differently when it is disposed in a living room as illustrated in FIG. 1 and when it is disposed in a room to detect the presence of an object.

Figure 2A:
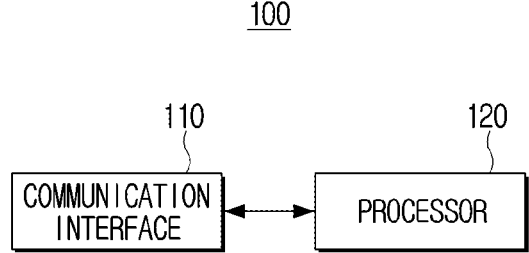
FIG. 2A is a block diagram illustrating an example configuration of an electronic apparatus according to various embodiments.

FIG. 2A is a block diagram illustrating an example configuration of the electronic apparatus 100 according to various embodiments. As illustrated in FIG. 2A, the electronic apparatus 100 includes a communication interface (e.g., including communication circuitry) 110 and a processor (e.g., including processing circuitry) 120.

The communication interface 110 may include various communication circuitry and is configured to transmit/receive a signal according to various types of communication methods. For example, the communication interface 110 may include an infrared ray (IR) transmitter and an IR receiver and an IR receiver, and may transmit/receive an infrared signal.

In addition, the communication interface 110 may perform communication with various types of external devices according to various types of communication methods. For example, the electronic apparatus 100 may perform communication with a user terminal 200, a server 300, etc. through the communication interface 110.

The communication interface 110 may include a Wi-Fi module, a Bluetooth module, an infrared communication module, and a wireless communication module, each including various circuitry. Each of the communication modules may be implemented in the form of at least one hardware chip.

The Wi-Fi module and the Bluetooth module perform communication in a WiFi method and in a Bluetooth method, respectively. When the Wi-Fi module or the Bluetooth module is used, various connection information such as a service set identifier (SSID) and a session key may be transmitted and received, communication may be established using the various connection information, and thereafter various types of information may be transmitted or received. The infrared communication module performs communication according to infrared data association (IrDA) for wirelessly transmitting data within a short distance using infrared rays between visual rays and millimeter waves.

The wireless communication module may include at least one communication chip for performing communication according to various wireless communication standards such as ZigBee, 3rd Generation (3G), 3rd Generation Partnership Project (3GPP), Long Term Evolution (LTE), LTE Advanced (LTE-A), 4th Generation (4G), and 5th Generation (5G), in addition to the communication methods described above.

The communication interface 110 may include a wired communication interface such as HDMI, DP, Thunderbolt, USB, RGB, D-SUB, DVI, etc.

The communication interface 110 may include at least one of a local area network (LAN) module, an Ethernet module, or a wired communication module for performing communication using a pair cable, a coaxial cable, an optical fiber cable or the like.

The processor 120 may include various processing circuitry and controls the overall operations of the electronic apparatus 100. For example, the processor 120 may be connected to each component of the electronic apparatus 100 to control the overall operations of the electronic apparatus 100. For example, the processor 120 may be connected to a component such as the communication interface 110 and control the operations of the electronic apparatus 100.

According to an embodiment, the processor 120 may, for example, and without limitation, be embodied as a digital signal processor (DSP), a microprocessor, or a time controller (TCON). However, the processor 120 is not limited thereto, and may include or be referred to as at least one of a central processing unit (CPU), a micro-controller unit (MCU), a micro-processing unit (MPU), a controller, an application processor (AP), a communication processor (CP), or an ARM processor. The processor 120 may be embodied as a system-on-chip (SoC) storing a processing algorithm, a large-scale integrated (LSI) circuit, or a field programmable gate array (FPGA).

The processor 120 may control the communication interface 110 to transmit a signal of a specific carrier frequency, and if a signal is not received through the communication interface 110 within the first threshold time after the signal is transmitted, the search carrier frequency may be determined based on a specific carrier frequency.

For example, the processor 120 may control the communication interface 110 to transmit the signal of the first carrier frequency, and when a signal is received through the communication interface 110 within the first threshold time after the signal of the first carrier frequency is transmitted, may control the communication interface 110 to transmit a signal of the second carrier frequency that is different from the first carrier frequency. For example, when a signal that is generated as the signal of the first carrier frequency is reflected by the space where the electronic apparatus is disposed is received through the communication interface 110 within the first threshold time, the processor 120 may control the communication interface 110 to transmit the signal of the second carrier frequency. In other words, the processor 120 may identify whether a signal is received through the communication interface 110 within the first threshold time after the signal is transmitted by gradually changing the carrier frequency.

The processor 120 may control the communication interface 110 to transmit the signal of the first carrier frequency, and when a signal is not received through the communication interface 110 within the first threshold time after the signal of the first carrier frequency is transmitted, the first carrier frequency may be determined as the search carrier frequency. For example, when the reflected signal is not received through the communication interface 110 within the first threshold time, the processor 120 may determine the first carrier frequency as the search carrier frequency. In other words, the processor 120 may gradually change the carrier frequency until a signal is not received through the communication interface 110 within the first threshold time after transmission of the signal.

When a signal is received through the communication interface 110 within the first threshold time after the signal of the first carrier frequency is transmitted, the processor 120 may control the communication interface 110 to transmit the signal of the second carrier frequency that is different from the first carrier frequency. In this case, the processor 120 may repeat the above operation until a signal is not received through the communication interface 110 within the first threshold time, and when it is identified that a signal that has been received is not being received, may determine the carrier frequency corresponding to a point of time at which the signal is not received as the search carrier frequency.

When a signal is not received through the communication interface 110 within the first threshold time after the signal of the first carrier frequency is transmitted, the processor 120 may control the communication interface 100 to transmit the signal of the second carrier frequency that is different from the first carrier frequency. In this case, the processor 120 may repeatedly perform the above operation until a signal is received through the communication interface 110 within the first threshold time, and when it is identified that a signal has not been received and then, a signal is being received, may determine that the carrier frequency corresponding to a point of time at which the signal is not received for the last time as the search carrier frequency.

In other words, the processor 120 may determine the search carrier frequency based on whether or not reception of a signal is changed within the first threshold time after the signal of a specific carrier frequency is transmitted. The processor 120 may gradually increase the carrier frequency when a signal is received within the first threshold time, and may gradually decrease the carrier frequency when a signal is not received within the first threshold time. However, the present disclosure is not limited thereto, and the processor 120 may gradually decrease the carrier frequency when a signal is received within the first threshold time, and may gradually increase the carrier frequency when a signal is not received within the first threshold time.

Through the above operation, the processor 120 may reflect the characteristics of the space where the electronic apparatus 100 is disposed. For example, the signal transmitted from the electronic apparatus 100 is reflected towards the surrounding space, and the processor 120 may receive a reflected signal through the communication interface 110. In this case, the reception rate varies according to the size of the carrier frequency, and the processor 120 identifies the carrier frequency on which a signal is not received and identifies the present of an object to be described later based on the identified carrier frequency.

The identified carrier frequency is determined by the current space, and when the space is changed, the carrier frequency may also be changed. In other words, an operation adaptive to a space is possible using the method of gradually changing the carrier frequency.

Meanwhile, in the above description, there is no particular limitation on a signal that is received after the signal is transmitted, but the present disclosure is not limited thereto. For example, when a difference between the carrier frequency of the reflected signal and the first carrier frequency is equal to or less than the threshold value, the processor 120 may control the communication interface 110 to transmit a signal to the second carrier frequency. In other words, the processor 120 may identify whether the transmitted signal and the received signal are the same, and only when it is identified that they are the same, may control the communication interface 110 to transmit a signal to the second carrier frequency and when it is identified that they are not the same, may determine the corresponding carrier frequency s the search carrier frequency.

When the search carrier frequency is determined in the above method, the processor 120 may control the communication interface 110 to transmit the signal of the search carrier frequency, and may identify the presence of an object based on whether a signal is received through the communication interface within the second threshold time after the signal of the search carrier frequency is transmitted.

For example, when a signal is received through the communication interface 110 within the second threshold time after the signal of the search carrier frequency is transmitted, the processor 120 may identify that an object is present. The received signal may be a signal that is generated as the signal of the search carrier frequency is reflected by the object.

Meanwhile, in the above description, there is no particular limitation on a signal that is received after the signal of the search carrier frequency is transmitted, but the present disclosure is not limited thereto. For example, when a difference between the carrier frequency of the signal reflected by the object and the search carrier frequency is equal to or less than the threshold value, the processor 120 may identify that the object is present. In other words, the processor 120 may identify whether the signal transmitted to the search carrier frequency and the received signal are the same and only when it is identified that they are the same, identify that the object is present. If it is identified that the signals are not the same, the processor 120 may identify that the object is not present.

Meanwhile, the electronic apparatus 100 may further include a microphone, and when it is identified that an object is present, the processor 120 may turn on the microphone and identify whether the object is a user based on sound received from the turned-on microphone. In other words, the processor 120 may identify whether the object is present through the communication interface 110 and subsequently, by turning on the microphone, may identify whether the object is a user while reducing power consumption.

In addition, the electronic apparatus 100 may include a stereo microphone, and the processor 120 may identify the direction of the user through the stereo microphone. In this case, the stereo microphone may be disposed on opposite sides of the center of the electronic apparatus 100, respectively.

However, the electronic apparatus 100 is not limited thereto, and may further include any component for enhancing the accuracy of identifying an object. For example, the electronic apparatus 100 may further include a camera, and when it is identified that an object is present, the processor 120 may turn on the camera and identify whether the object is a user based on an image received from the turned-on camera.

When it is identified that an object is present, the processor 120 may control the communication interface 110 to transmit a signal of the search carrier frequency at predetermined (e.g., specified) time intervals. In other words, the processor 120 may periodically identify whether the presence of the object is maintained after the object is identified.

However, the present disclosure is not limited thereto, and the processor 120 may control the communication interface 110 to transmit a signal of the search carrier frequency at predetermined first time intervals and when it is identified that an object is present, may control the communication interface 110 to transmit a signal of the search carrier frequency at predetermined second time intervals. In other words, the processor 120 may perform the operation of periodically identifying whether an object is present and subsequently, when it is identified that an object is present, may change the period. For example, when it is identified that an object is present, the processor 120 may control the communication interface 110 to transmit a signal of the search carrier frequency in a state where the time interval is further reduced.

When a signal is not received through the communication interface 110 within the second threshold time after a signal of the search carrier frequency is transmitted at predetermined time intervals, the processor 120 may identify that there is no object and control the communication interface 110 to re-transmit a signal of a specific carrier frequency. When a signal is not received through the communication interface 110 within the first threshold time after the signal is re-transmitted, the processor 120 may update the search carrier frequency based on a specific carrier frequency.

In other words, when the present of an object is identified and then, the object is not identified again, the processor 120 may change the search carrier frequency adaptively to the space where the electronic apparatus 100 is disposed by performing the operation of updating the search carrier frequency. Such an operation may be usual when the user changes the arrangement of home appliances, furniture, etc. in the space.

Meanwhile, the communication interface 110 may include an IR transmitter and an IR receiver, and the processor 120 may control the IR transmitter to transmit a signal of a specific carrier frequency and after the signal is transmitted, when a signal is not received through the IR receiver within the first threshold time, may determine a search carrier frequency based on the specific carrier frequency and by controlling the IR transmitter to transmit a signal of the search carrier frequency, may identify whether an object is present based on whether a signal is received through the IR receiver within the second threshold time after the signal of the search carrier frequency is transmitted.

In other words, the processor 120 may identify whether an object is present using an infrared signal. However, the present disclosure is not limited thereto, and any standard may be used as long as the standard is a communication standard capable of identifying the presence of an object by gradually changing the carrier frequency.

Figure 2B:
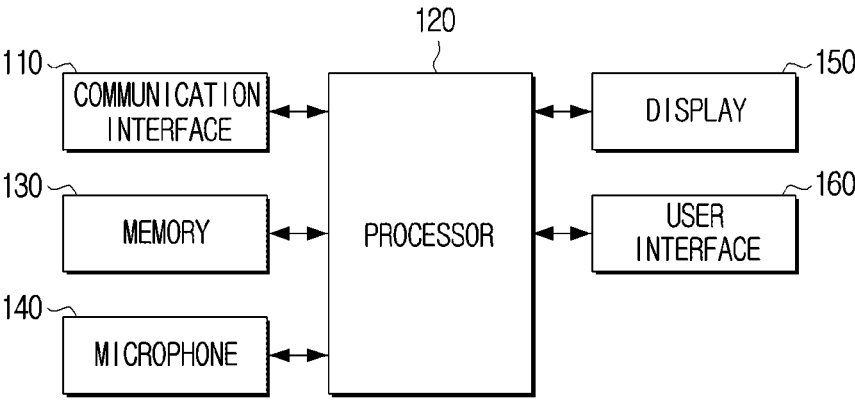
FIG. 2B is a block diagram illustrating an example configuration of an electronic apparatus according to various embodiments.

FIG. 2B is a block diagram illustrating an example configuration of an electronic apparatus according to various embodiments. The electronic apparatus 100 may include the communication interface 110 and the processor 120. In addition, according to FIG. 2B, the electronic apparatus 100 may further include a memory 130, a microphone 140, a display 150, and a user interface (e.g., including user interface circuitry) 160. A detailed description regarding the components overlapped with those illustrated in FIG. 2A among the components illustrated in FIG. 2B, may not be repeated.

The memory 130 may refer to hardware that stores information such as data in an electrical or magnetic form so that it can be accessible by the processor 120, etc. To this end, the memory 130 may be implemented as hardware of at least one of non-volatile memory, volatile memory, flash memory, hard disk drive (HDD), or solid state drive (SSD), RAM, ROM, etc.

At least one instruction or module required for the operation of the electronic apparatus 100 or the processor 120 may be stored in the memory 130. The instruction may be a code unit including various executable program instructions for instructing the operation of the electronic apparatus 100 or the processor 120, and may be written in machine language which is a language that a computer can understand. The module may be a set of instructions that perform a specific task of a unit of work.

The memory 130 may store data that is information in units of bits or bytes that can represent characters, numbers, images, and the like. For example, a module for identifying a search carrier frequency may be stored in the memory 130.

The memory 130 is accessed by the processor 130, and reading/recording/modifying/deleting/updating, etc. for instructions, modules or data may be performed by the processor 120.

The microphone 140 is configured to receive a user voice or other sound and convert the same into audio data.

The display 150 may be implemented as displays in various forms such as, for example, and without limitation, a Liquid Crystal Display (LCD), Organic Light Emitting Diodes (OLED) display, Plasma Display Panel (PDP), etc. The display 150 may also include a driving circuit, a backlight circuit, etc. that can be implemented in the form of a-si TFT, low temperature poly silicon (LTPS) TFT, organic TFT (OTFT), etc. Meanwhile, the display 150 may be implemented as a touch screen combined with a touch sensor, a flexible display, a 3D display, etc.

The user interface 160 may include various user interface circuitry and be implemented as a button, a touch pad, a mouse, or a keyboard, or may also be implemented as a touch screen that may also perform the display function described above and a manipulation/input function. The button may be various types of buttons such as mechanical buttons, touch pads, wheels, and the like, which are formed in arbitrary areas such as a front portion, a side portion, or a back portion of an exterior of a main body of the electronic apparatus 100.

As such, the electronic apparatus 100 may identify a search carrier frequency, and identify the presence of an object by transmitting a signal of the search carrier frequency.

Hereinafter, the operation of the electronic apparatus 100 will be explained in greater detail with reference to various drawings.

Figure 3:
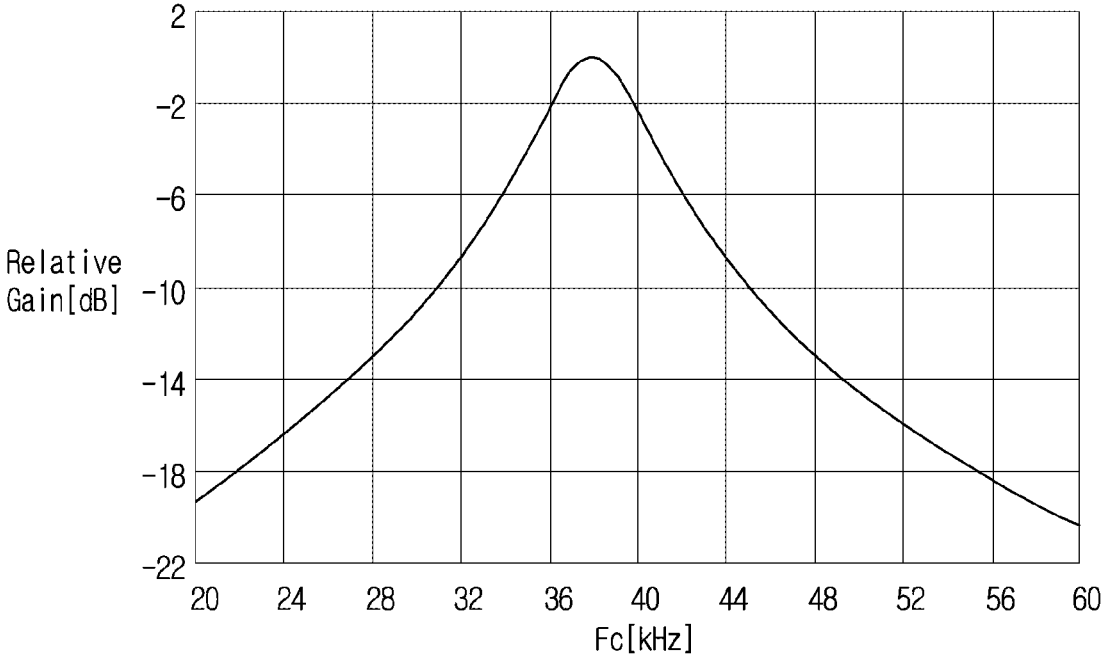
FIG. 3 is a graph illustrating an example search carrier frequency according to various embodiments.

FIG. 3 is a graph illustrating an example search carrier frequency according to various embodiments. In FIG. 3, the x-axis represents the magnitude of the carrier frequency, and the y-axis represents the reception rate.

The processor 120 may control the communication interface 110 to transmit a signal of the carrier frequency of about 38 kHz having the best reception rate. When a signal is received through the communication interface 110 within the first threshold time after the signal is transmitted, the processor 120 may receive the signal by changing the carrier frequency. For example, the processor 120 may control the communication interface 110 to transmit a signal of the carrier frequency of 40 kHz. The processor 120 may repeat such an operation until a signal is not received through the communication interface 110 within the first threshold time after the signal is transmitted.

For example, the processor 120 may control the communication interface 110 to transmit a signal of the carrier frequency of 48 kHz, and when a signal is not received through the communication interface 110 within the first threshold time after the signal is transmitted, may determine a search carrier frequency based on the carrier frequency of 48 kMz.

For example, the processor 120 may determine a carrier frequency of 48 kHz as a search carrier frequency. The processor 120 may determine a carrier frequency of 50 kHz as a search carrier frequency by rounding up the carrier frequency. However, the present disclosure is not limited thereto, and as long as it is 48 kHz or higher, a search carrier frequency may be determined in any method.

Meanwhile, in the above description, the processor 120 initially transmits a signal of the carrier frequency having the best reception rate, but a search operation may be performed in other frequencies as well. For example, the processor 120 may control the communication interface 110 to first transmit a signal of the search carrier frequency that is set previously. In this case, the magnitude of the search carrier frequency may be gradually decreased according to a change in the location of the electronic apparatus 100 and a change in the arrangement of home appliances and furniture in the space. For example, when an object is no longer identified, the processor 120 may control the communication interface 110 to first transmit a signal of the search carrier frequency and when a signal is not received through the communication interface 110 within the first threshold time, may control the communication interface 110 to transmit a signal of a carrier frequency smaller than the search carrier frequency.

Figure 4A:
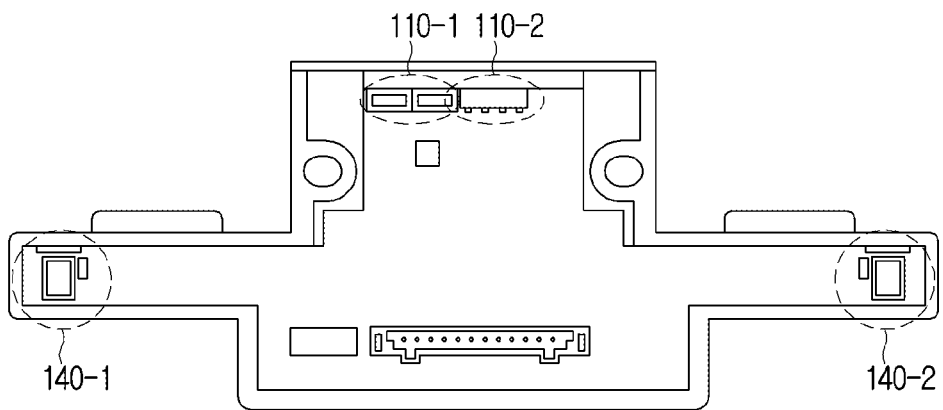
FIGS. 4A and 4B are diagrams illustrating an example complex sensing operation according to various embodiments.
Figure 4B:
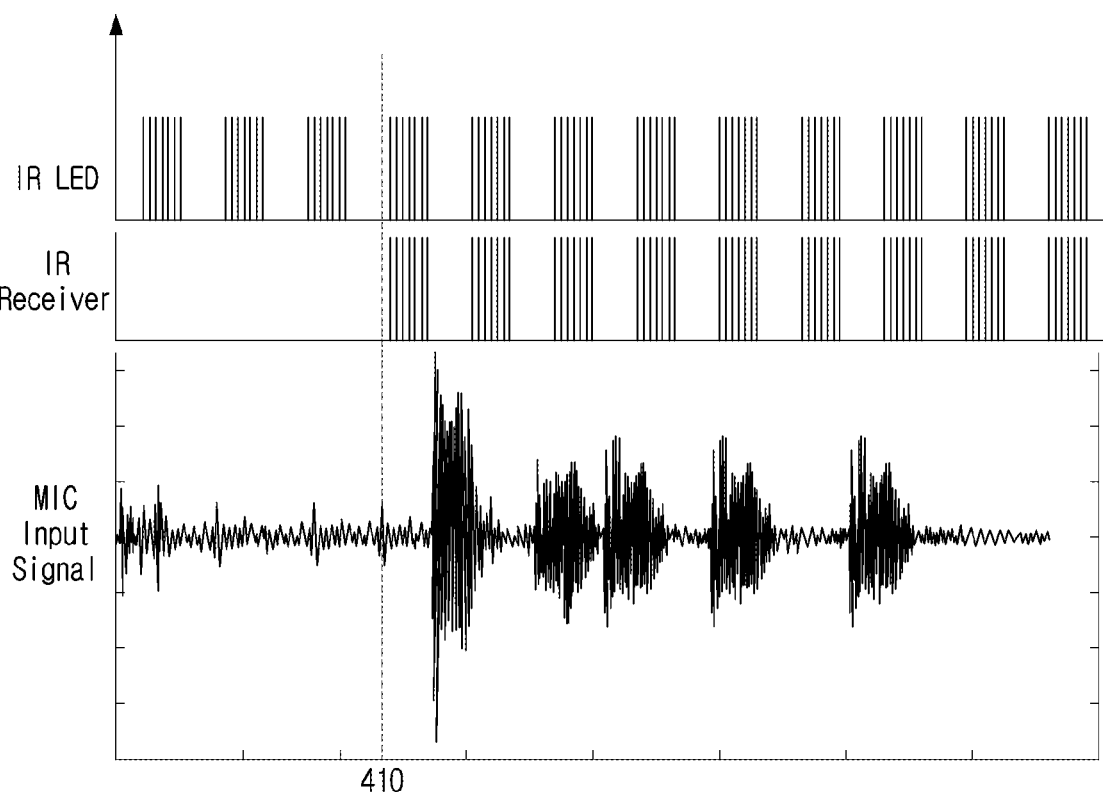

FIGS. 4A and 4B are diagrams illustrating an example complex sensing operation according to various embodiments.

FIG. 4A is a diagram illustrating an IR transmitter 110-1, an IR receiver 110-2 and microphones 140-1, 140-2 implemented as one module.

As illustrated in FIG. 4A, the IR transmitter 110-1 and the IR receiver 110-2 may be provided in one module, and as the IR transmitter 110-1 uses a carrier frequency capable of passing through the injection molding of the electronic apparatus 100, the module may be disposed inside the electronic apparatus 100. The IR receiver 110-2 may also receive a signal of the corresponding carrier frequency.

The microphones 140-1, 140-2 are provided on each side of the module, respectively, and when a signal is received (410) by the IR receiver 110-2 within the second threshold time after the signal of the target carrier frequency is transmitted by the IR transmitter 110-1, the module may be turned on and receive ambient sound as illustrated in FIG. 4B.

When the presence of a user is identified through the microphones 140-1, 140-2, the mode of the electronic apparatus 100 may be changed to an ambient mode. In addition, the processor 120 may identify the direction of sound through the two microphones 140-1, 140-2 and perform various interactions with the user based on the sound direction. For example, the processor 120 may provide a UI effect in the sound direction or display a UI where a touch operation is possible in the sound direction.

The ambient mode may be a mode for displaying additional information when the user does not watch content. For example, the electronic apparatus 100 may display additional information according to a turn-off command or a command to enter the ambient mode. The additional information may be at least one of weather, time or real-time news. The additional information may be the same image as the surface of the wall behind the electronic apparatus 100. In this case, the user may identify only the edge of the electronic apparatus 100 and identify the display area of the electronic apparatus 100 as a wall, thereby minimizing and/or reducing the sense of heterogeneity caused by the electronic apparatus 100.

However, the present disclosure is not limited thereto, and the electronic apparatus 100 may operate in the ambient mode by various conditions. For example, when the user's presence has not been identified and it is identified, the electronic apparatus 100 may operate in the ambient mode. When it is identified that the user has been watching content and the user's presence is no longer identified or the user's attention is not recognized, the electronic apparatus 100 may operate in the ambient mode.

Meanwhile, the module of FIG. 4A is only an example, and the module may be implemented in other forms such as a module including an IR transmitter/receiver and a microphone. For example, each of the IR transmitter 110-1, the IR receiver 110-2 and the microphones 140-1, 140-2 in FIG. 4A may be implemented as a separate module.

Figure 5:
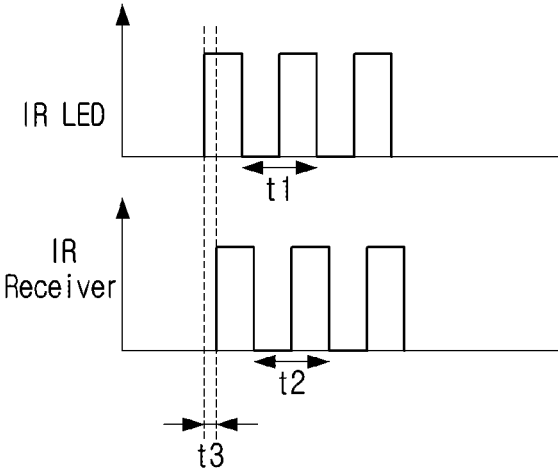
FIG. 5 is a timing diagram illustrating an example determination of whether a transmission/reception signal is the same according to various embodiments.

FIG. 5 is a timing diagram illustrating an example determination of whether a transmission/reception signal is the same according to various embodiments.

As illustrated in FIG. 5, the signal of the IR transmitter and the signal of the IR receiver may have different periods and phases. For example, the signal of the IR transmitter and the signal of the IR receiver may be different from each other as the signal of the IR transmitter may have the period of t1 and the signal of the IR receiver may have the period of t2. This is because there is a possibility that the frequency may change according to the reflection.

The processor 120 may identify whether the signals are the same based on the period of the signal of the IR transmitter and the signal of the IR receiver. For example, when the difference in the period between the signal of the IR transmitter and the signal of the IR receiver is within the first threshold value, the processor 120 may identify that the two signals are the same.

The processor 120 may identify whether the two signals are the same based on the phase difference (t3) between the signal of the IR transmitter and the signal of the IR receiver. For example, when the difference in the phase between the signal of the IR transmitter and the signal of the IR receiver is within the second threshold value, the processor 120 may identify that the two signals are the same.

As described above, the processor 120 may determine a search carrier frequency or identify the presence of an object based on whether the two signals are identical.

Figure 6A:
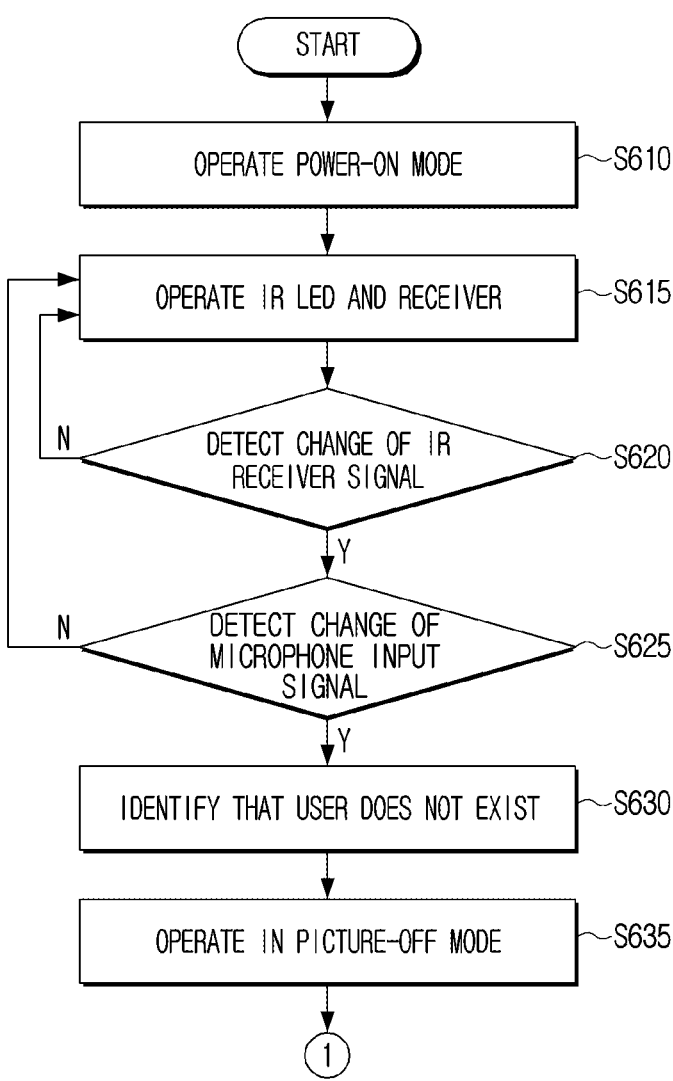
FIGS. 6A and 6B are flowcharts illustrating an example change of operation mode according to various embodiments.
Figure 6B:
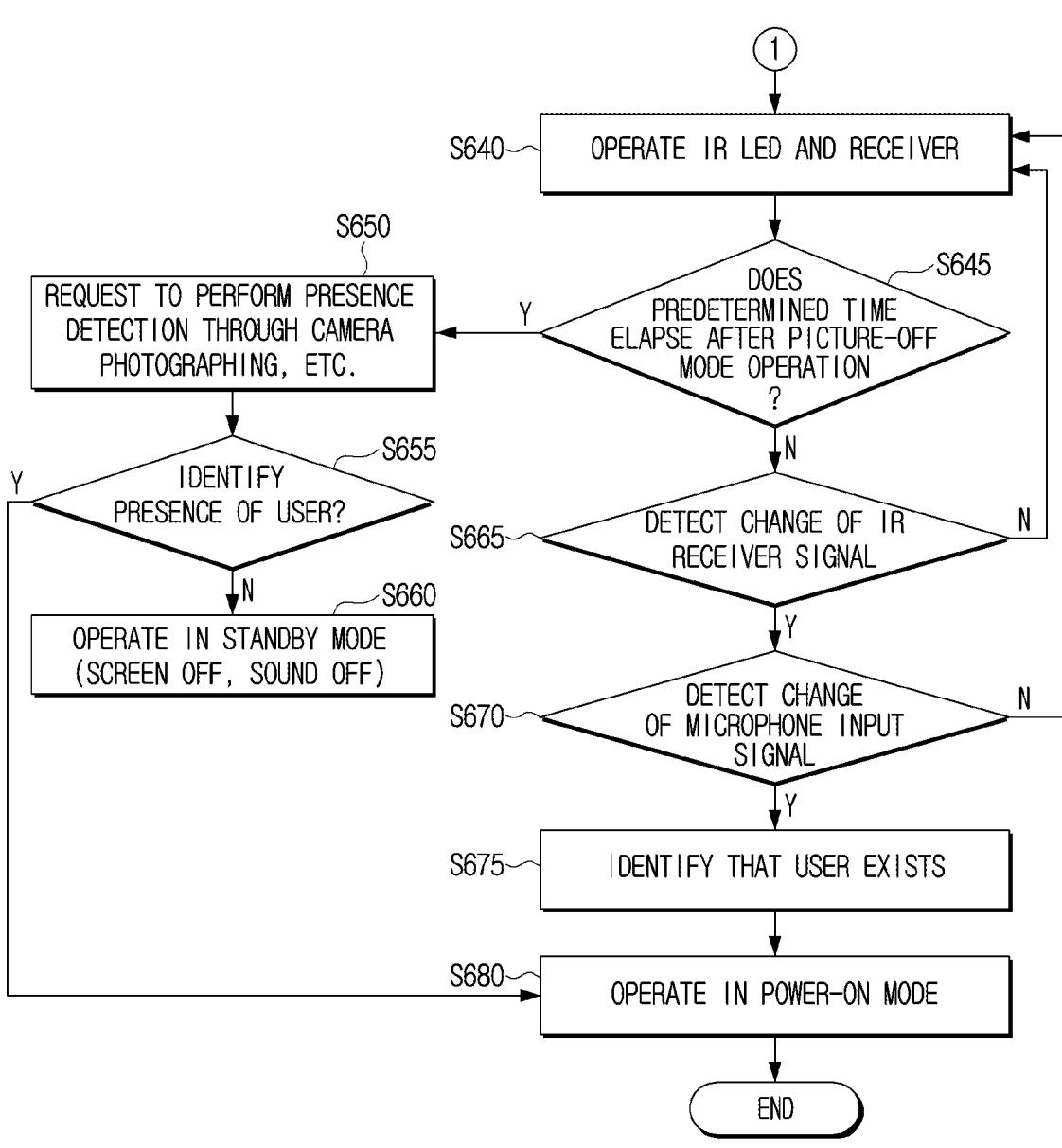

FIGS. 6A and 6B are flowcharts illustrating an example change of an operation mode according to various embodiments. In FIGS. 6A and 6B, it is assumed that the search carrier frequency is determined.

As illustrated in FIG. 6A, the electronic apparatus 100 may be turned on and operate in a power-on mode (S610). The electronic apparatus 100 may display a screen and output sound in the power on mode.

The processor 120 may identify the presence of an object by controlling an IR transmitter (LED) and an IR receiver (S615, S620). For example, when a signal is suddenly received in a state where a signal is not received through the IR receiver, the processor 120 may identify that there is an object (S620-Y).

When it is identified that an object is present, the processor 120 may turn on a microphone and identify whether the object is a user based on sound received from the turned-on microphone (S625). When it is identified that the user is not present (S630), the processor 120, the operation mode of the electronic apparatus 100 may be changed to a picture-off mode (S635). In the picture-off mode, the electronic apparatus 100 may output only sound without providing a screen.

When the electronic apparatus 100 enters the picture-off mode, the processor 120 may identify the presence of an object by controlling the IR transmitter (LED) and the IR receiver (S640). When a predetermined time elapses after the picture-off mode operates (S645—Y), the processor 120 may identify the presence of a user through camera photographing, etc. (S650). When the presence of a user is not identified (S655—N), the processor 120 may change the operation mode of the electronic apparatus 100 to a standby mode, and when the presence of a user is identified (S655—Y), the processor 120 may change the operation mode of the electronic apparatus 100 to a power-on mode (S680). The electronic apparatus 100 neither provides a screen nor outputs sound in the standby mode.

When it is within a predetermined time after the picture-off mode starts (S645—N), the processor 120 may identify the presence of an object by controlling the IR transmitter (LED), the IR receiver and the microphone (S665, S670). When it is identified that an object is present (S675), the processor 120 may change the operation mode of the electronic apparatus 100 to the power-on mode (S680).

Meanwhile, in FIGS. 6A and 6B, it is described that the presence of a user is identified through a microphone or a camera, but the present disclosure is not limited thereto. For example, any sensor capable of identifying the presence of a user instead of a microphone or a camera may be used. In addition, in FIGS. 6A and 6B, the processor 120 may omit the step of identifying the presence of a user through a microphone or a camera and identify the presence of a user based only on the received IR signal.

As described above, the processor 120 may change the operation mode of the electronic apparatus 100 based on at least one of whether there is an object or when a specific mode is entered.

Figure 7:
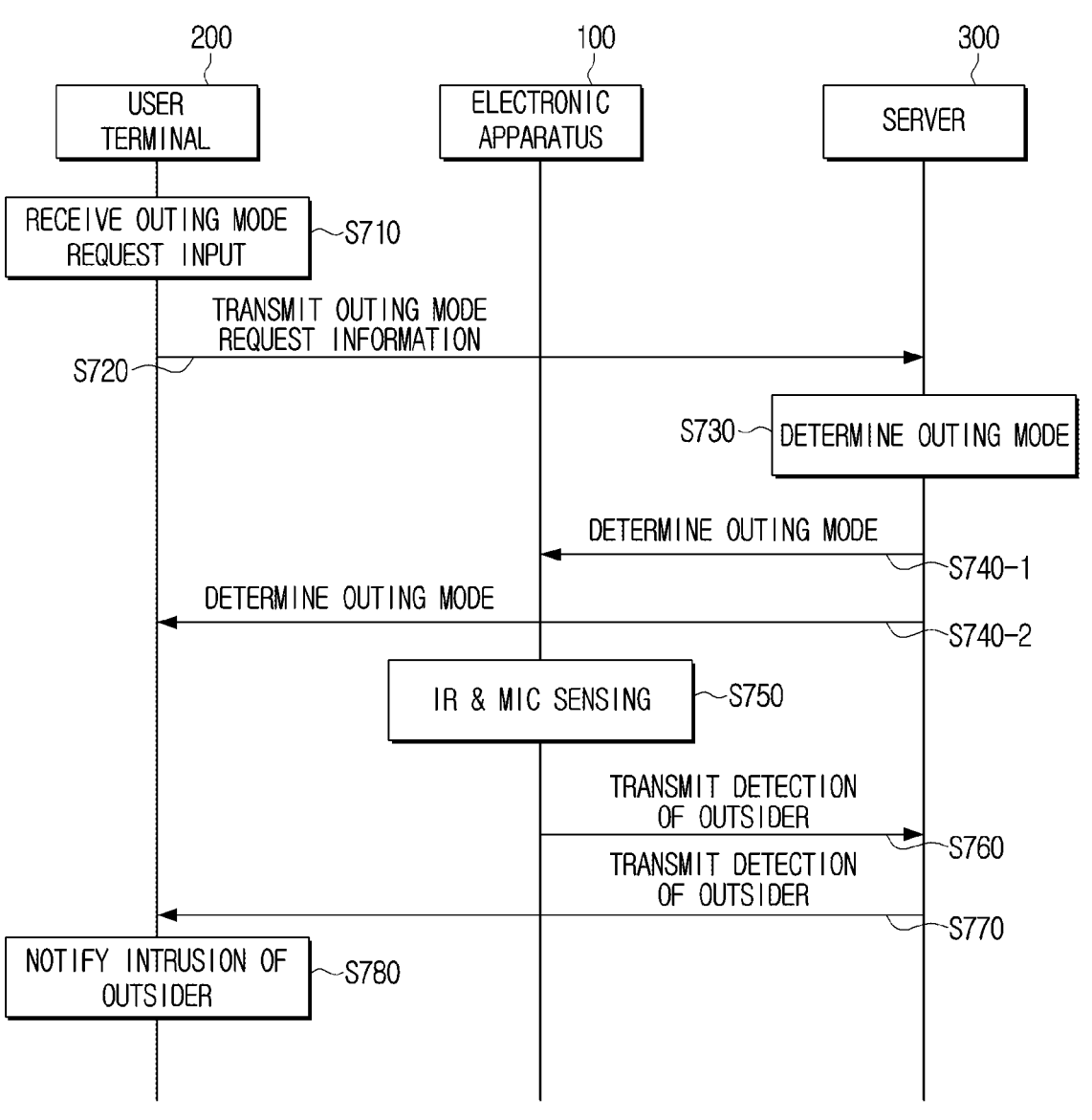
FIG. 7 is a signal flow diagram illustrating an example operation of a security mode according to various embodiments.

FIG. 7 is a signal flow diagram illustrating an example operation of a security mode according to various embodiments.

The user terminal 200 may receive an outing mode request input (S710). In this case, the user terminal 200 may transmit outing mode request information to the server 300 (S720), the server 300 may enter the outing mode (S730), and outing mode determination information may be transmitted to the electronic apparatus 100 and the user terminal 200 (S740-1, S740-2).

According to the user's going out, the electronic apparatus 100 may identify the presence of an outsider through the IR transmitter/receiver and the microphone (S750), and when an outsider is detected, may transmit the corresponding information to the server 300 (S760). The server 300 may provide the detection information of the outsider to the user terminal 200 (S770), and the user terminal 200 may provide the user with an outsider intrusion notification (S780).

FIG. 7 illustrates that the electronic apparatus 100 and the server 400 are separate devices, but the present disclosure is not limited thereto. The electronic apparatus 100 may serve as the server 300.

Figure 8:
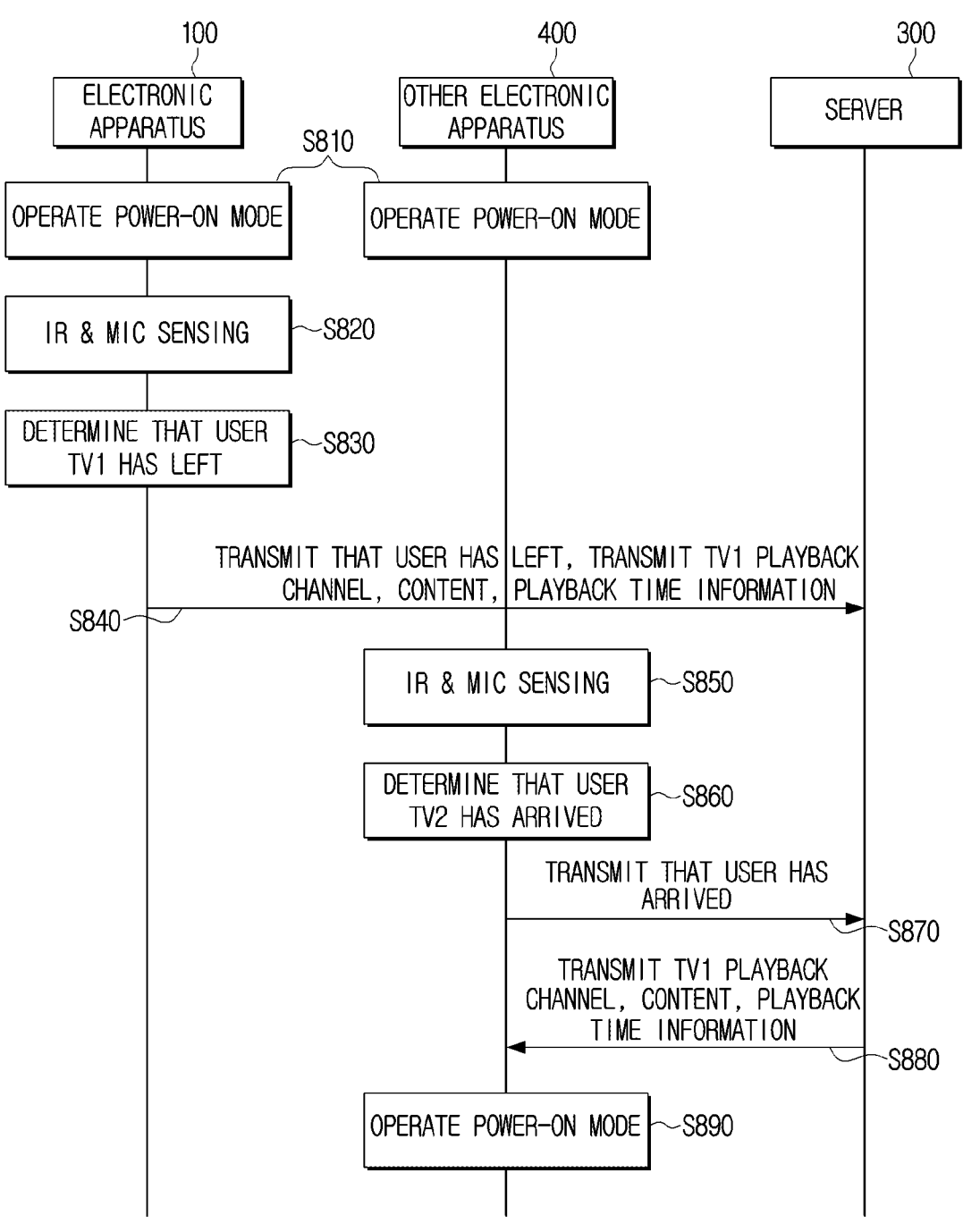
FIG. 8 is a signal flow diagram illustrating an example seamless play operation according to various embodiments.

FIG. 8 is a signal flow diagram illustrating an example seamless play operation according to various embodiments. FIG. 8 illustrates that each of the electronic apparatus 100 and other electronic apparatus 400 is a TV for convenience of explanation and it will be understood that the disclosure is not limited thereto.

The electronic apparatus 100 (TV1) and the other electronic apparatus 400 (TV2) may operate in the power-on mode and the standby mode (S810), and identify the presence of a user through the IR transmitter/receiver and the microphone, respectively (S820, S850).

When a user is no longer identified while identifying the presence of the user (S830), the electronic apparatus 100 may transmit information indicating that the user is not identified, the current playback channel, content, and playback time information to the server 300 (S840).

Subsequently, when the other electronic device 400 identifies the presence of a user using the IR transmitter/receiver and the microphone (S850, S860), the corresponding information may be transmitted to the server 300 (S870). The server 300 may transmit the current playback channel, content and playback time information received from the electronic apparatus 100 to the other electronic apparatus 400 (S880), and the other electronic apparatus 400 may operate in the power-on mode (S890) and provide a user with the content based on the information received from the server. In this case, the electronic apparatus 100 may change the operation mode to the standby mode. Through the above operation, the user may use a content providing service seamlessly.

Meanwhile, in the above description, the electronic apparatus 100 and the other electronic apparatus 400 directly identify the presence of a user, but the present disclosure is not limited thereto. For example, when the electronic apparatus 100 operates as an IoT Hub, the electronic apparatus 100 may identify the presence of a user through the IR transmitter/receiver, and when the presence of a user is identified, may identify IoT devices (things) connected to the electronic apparatus 100 and request sensing data from the identified IoT devices. When the presence of a user is identified, the electronic apparatus 100 may identify IoT devices connected to the electronic apparatus 100 and request sensing data from IoT devices having a sensor capable of identifying the presence of a user from among the identified IoT devices. The electronic apparatus 100 may secondarily identify the presence of a user based on the sensing data received from the IoT devices, thereby improving accuracy. Here, the IoT devices may include a home appliance equipped with a sensor for identifying the presence of a user as well as a sensor itself for identifying the presence of a user.

Even before the presence of a user is identified, the electronic apparatus 100 may identify IoT devices connected to the electronic apparatus 100 and request sensing data from the identified IoT devices. In this case, the electronic apparatus 100 may identify the presence of a user beyond the range that can be identified by the electronic apparatus 100. For example, in the embodiment of FIG. 8, the electronic apparatus 100 may receive sensing data that there is a user around the other electronic apparatus 400. When the presence of the user is identified around the electronic apparatus 100, the electronic apparatus 100 may request and receive the current playback channel, content, playback time information of the other electronic apparatus 400 from the other electronic apparatus 400. The electronic apparatus 100 may provide the content providing service seamlessly based on the received information. In addition, the electronic apparatus 100 may transmit a control signal for changing the mode of the other electronic apparatus 400 to the other electronic apparatus 400.

The electronic apparatus 100 may be indirectly connected to the IoT devices via an Access Point (AP), rather than being directly connected to the IoT devices. In this case, the electronic apparatus 100 may request sensing data from the AP, and the AP may request the sensing data from the IoT devices. The AP may transmit the sensing data received from the IoT devices to the electronic apparatus 100.

However, the present disclosure is not limited thereto, and the collection of the sensing data by the AP may be independent of the request of the electronic apparatus 100. For example, the AP may request and store the sensing data from the IoT devices at a predetermined time interval. In this case, the AP may transmit the sensing data in a predetermined time range before and after a point of time of the request of the electronic apparatus 100 according to the request of the electronic apparatus.

Figure 9:
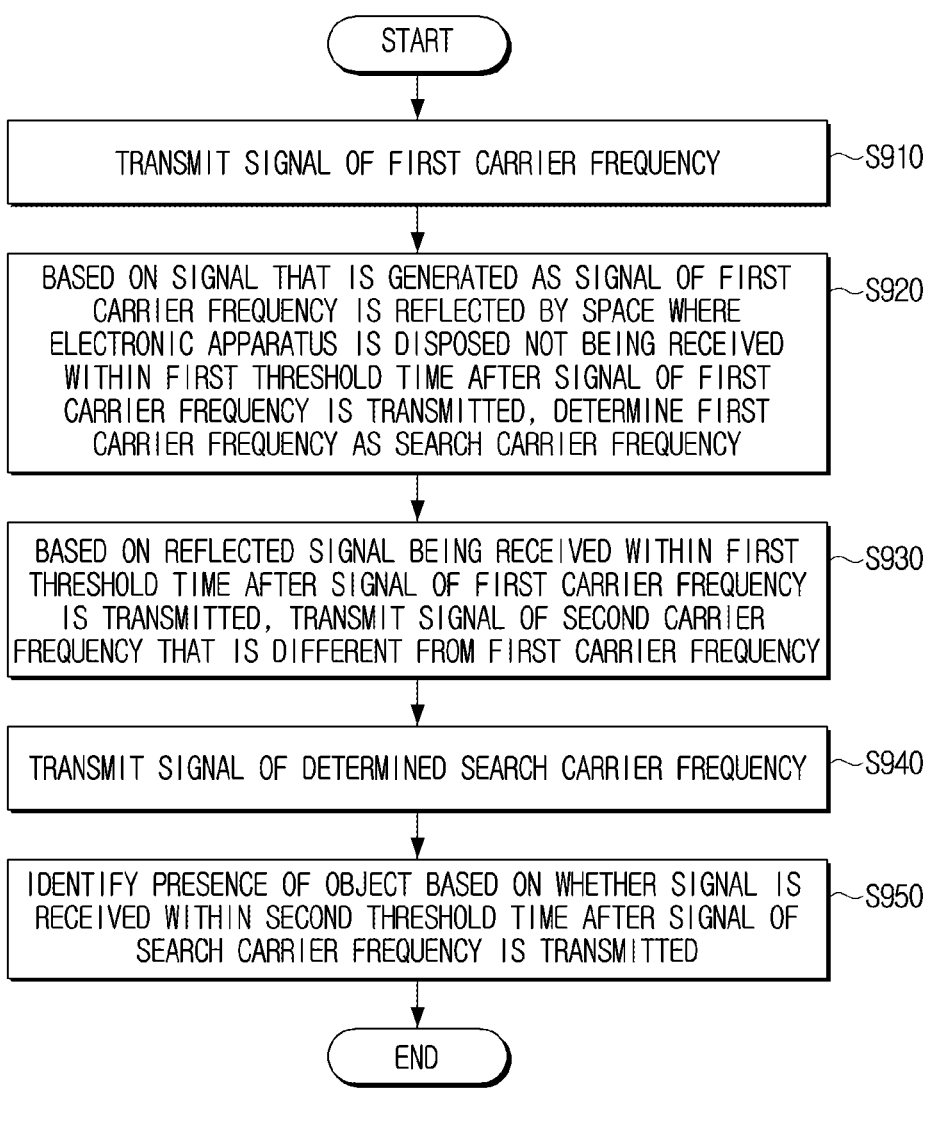
FIG. 9 is a flowchart illustrating an example method of operating an electronic apparatus according to various embodiments.

FIG. 9 is a flowchart illustrating an example method of controlling an electronic apparatus according to various embodiments.

A signal of the first carrier frequency is transmitted (S910). When a signal that is generated as the signal of the first carrier frequency is reflected by a space where the electronic apparatus is disposed is not received within the first threshold time after the signal of the first carrier frequency is transmitted, the first carrier frequency is determined as a search carrier frequency (S920). When the reflected signal is received within the first threshold time after the signal of the first carrier frequency is transmitted, a signal of the second carrier frequency that is different from the first carrier frequency is transmitted (S930).

A signal of the determined search carrier frequency is transmitted (S940). The presence of an object is identified based on whether a signal is received within the second threshold time after the signal of the search carrier frequency is transmitted (S950).

The identifying (S950) may include identifying that there is an object when a signal is received within the second threshold time after the signal of the search carrier frequency is transmitted, and the received signal may be a signal that is generated as the signal of the search carrier frequency is reflected by the object.

The identifying (S950) may include identifying that there is an object when a difference between the carrier frequency of the reflected signal and the search carrier frequency is equal to or less than a threshold value.

Meanwhile, the operation may further include, when it is identified that there is an object, turning on a microphone provided in the electronic apparatus and identifying whether the object is a user based on sound received from the turned-on microphone.

The operation may further include, when a user is identified while the electronic apparatus operates in the first mode, changing the first mode to the second mode and displaying a UI corresponding to the second mode.

The first mode may be a power-off mode or a standby mode, and the second mode may be an ambient mode.

The transmitting a signal of the second carrier frequency (S930) may include, when a difference between the carrier frequency of the reflected signal and the first carrier frequency is equal to or less than a threshold value, transmitting the signal to the second carrier frequency.

Meanwhile, the operation may further include, when it is identified that there is an object, transmitting a signal of the search carrier frequency at a predetermined time interval.

The operation may further include, when a signal is not received within the second threshold time after the signal of the search carrier frequency is transmitted at a predetermined time interval, identifying that there is no object, and when it is identified that there is no object, re-performing the operation of determining the search carrier frequency.

Meanwhile, the transmitting a signal of the first carrier frequency (S910) may include transmitting a first IR signal of the first carrier frequency, the determining step (S920) may include, when a second IR signal that is generated as the first IR signal is reflected by the space where the electronic apparatus is disposed is not received within the first threshold time after the first IR signal is transmitted, determining the first carrier frequency as the search carrier frequency, the transmitting a signal of the second carrier frequency (S930) may include, when the second IR signal is received within the first threshold time after the first IR signal is transmitted, transmitting a third IR signal of the second carrier frequency that is different from the first carrier frequency, the transmitting a signal of the search carrier frequency (S940) may include transmitting a fourth IR signal of the search carrier frequency, and the identifying (S950) may include identifying the presence of an object based on whether a fifth IR signal is received within the second threshold time after the fourth IR signal of the search carrier frequency is transmitted.

According to the above-described various example embodiments, an electronic apparatus may adaptively detect a user with respect to the surrounding space of the electronic apparatus by changing the carrier frequency of a sensor.

In addition, when the presence of a user is detected by the sensor, the accuracy of user detection may be improved by detecting the user through an auxiliary means such as a microphone.

Further, the sensor can be provided inside the electronic apparatus as the carrier frequency capable of passing through the injection molding of the electronic apparatus is used, it can be implemented regardless of the design of the electronic apparatus.

Meanwhile, according to an example embodiment of the disclosure, the various example embodiments described above may be implemented as software including instructions stored in a machine-readable storage media that are readable by a machine (e.g., a computer). The machine is a device capable of calling an instruction stored in a storage medium and operating according to the called instruction and may include an electronic apparatus (e.g., an electronic device A) according to the embodiments set forth herein. When an instruction is executed by a processor, a function corresponding to the command may be executed directly by the processor or executed using other components under control of the processor. The instruction may include code generated by a compiler or a code executable by an interpreter. The machine-readable storage media may be provided as non-transitory storage media. Here, the "non-transitory" storage medium may not include a signal and is tangible but does not indicate whether data is stored in the storage medium semi-permanently or temporarily.

In addition, according to an embodiment of the disclosure, methods according to various embodiments of the disclosure as described above may be provided by being included in a computer program product. The computer program product may be traded as a product between a seller and a purchaser. The computer program product may be distributed in the form of a machine-readable storage medium (e.g., compact disc read-only memory (CD-ROM)) or may be distributed online through an application store (e.g., Play Store™). When distributed online, at least some of the computer program product may be temporarily stored or generated in a storage medium such as server of a manufacturer, a server of an application store, or a memory of a relay server.

According to an embodiment, the various embodiments of the disclosure as described above may be implemented in a recording medium readable by a computer or the like using software, hardware or a combination thereof. In some cases, the embodiments described herein may be implemented as a processor. According to software implementation, the embodiments of the procedures and functions described herein can be implemented as separate software modules. Each of the software modules may perform one or more of the functions and operations described herein.

Computer instructions for performing a processing operation of a device according to the various embodiments described above may be stored in a non-transitory computer-readable medium. A processing operation of a machine according to the various embodiments described above is performed by a certain machine when the computer instructions stored in the non-transitory computer-readable medium are executed by a processor of the machine. The non-transitory computer-readable medium should be understood as a medium that stores data semi-permanently and that is readable by a machine. Examples of the non-transitory computer-readable medium may include a CD, a DVD, a hard disc, a Blu-ray disc, a USB, a memory card, and a ROM.

Each of the components (e.g., modules or programs) according to the various embodiments described above may include a single or multiple entities, and some of the sub-components described above may be omitted or other sub-components may be further included in various embodiments. Generally or additionally, some components (e.g., modules or programs) may be integrated into one entity that performs functions performed by the components in the same or similar way. According to various embodiments, operations may be performed by modules, programs or other components in a sequential, parallel, repetitive, or heuristic manner, at least some of the operations may be performed in a different order or omitted or other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
a communication interface comprising communication circuitry; and
at least one processor, comprising processor circuitry, configured, individually and/or collectively, to:
control the communication interface to transmit a signal of a first carrier frequency;
based on a first reflected signal being received through the communication interface, control the communication interface to transmit a signal of a second carrier frequency different from the first carrier frequency, the first reflected signal resulting as the transmitted signal of the first carrier frequency being reflected by a space where the electronic apparatus is disposed;
based on a second reflected signal not being received through the communication interface after the signal of the second carrier frequency is transmitted, determine the second carrier frequency as a search carrier frequency, the second reflected signal resulting as the transmitted signal of the second carrier frequency being reflected by the space where the electronic apparatus is disposed;
control the communication interface to transmit a signal of the determined search carrier frequency; and
identify whether an object is present based on whether a third reflected signal, resulting from the transmitted signal of the determined search carrier frequency, is received through the communication interface after the signal at the determined search carrier frequency is transmitted.

2. The apparatus as claimed in claim 1, wherein the at least one-processor is configured, individually and/or collectively, to, based on the third reflected signal being received after the signal of the determined search carrier frequency is transmitted, identify that the object is present, wherein the third reflected signal comprises a signal generated as the signal of the determined search carrier frequency being reflected by the object.

3. The apparatus as claimed in claim 2, wherein the at least one processor is configured, individually and/or collectively, to identify that the object is present based on a difference between a carrier frequency of the third reflected signal and the determined search carrier frequency being equal to or less than a threshold value.

4. The apparatus as claimed in claim 1, further comprising:
a microphone,
wherein the at least one processor is configured, individually and/or collectively, to:
based on identifying that the object is present, turn on the microphone; and
identify that the object is a user based on sound received from the turned-on microphone.

5. The apparatus as claimed in claim 4, further comprising:
a display,
wherein the at least one processor is configured, individually and/or collectively, to:
based on identifying the user while the electronic apparatus operates in a first mode, change the first mode to a second mode; and control the display to display a user interface (UI) corresponding to the second mode.

6. The apparatus as claimed in claim 5, wherein the first mode includes a power-off mode or a stand-by mode, and wherein the second mode includes an ambient mode.

7. The apparatus as claimed in claim 1, wherein the at least one processor is configured, individually and/or collectively, to control the communication interface to transmit the signal to the signal of the second carrier frequency based on a difference between a carrier frequency of the first reflected signal and the first carrier frequency being equal to or less than a threshold value.

8. The apparatus as claimed in claim 1, wherein the at least one processor is configured, individually and/or collectively, to, based on identifying that the object is present, control the communication interface to transmit the signal of the determined search carrier frequency at a specified time interval.

9. The apparatus as claimed in claim 8, wherein the at least one processor is configured, individually and/or collectively, to:

based on a signal not being received through the communication interface after the signal of the search carrier frequency is transmitted at the specified time interval, identify that the object is not present; and based on identifying that the object is not present, re-perform an operation of determining the search carrier frequency.

10. The apparatus as claimed in claim 1, wherein the communication interface comprises:

an infrared ray (IR) transmitter; and an IR receiver, wherein the at least one processor is configured, individually and/or collectively, to control the IR transmitter to transmit the signal of the first carrier frequency, and based on the first reflected signal being received through the IR receiver control the IR transmitter to transmit a signal of a second carrier frequency different from the first carrier frequency, the first reflected signal resulting as the transmitted signal of the first carrier frequency being reflected by the space where the electronic apparatus is disposed;

based on the second reflected signal not being received through the IR receiver after the signal of the second carrier frequency is transmitted, determine the second carrier frequency as a search carrier frequency, the second reflected signal resulting as the transmitted signal of the second carrier frequency being reflected by the space where the electronic apparatus is disposed;

control the IR transmitter to transmit a signal of the determined search carrier frequency; and identify whether the object is present based on whether the third reflected signal, resulting from the transmitted signal of the determined search carrier frequency, is received through the IR receiver after the signal at the determined search carrier frequency is transmitted.

11. A method of controlling an electronic apparatus, comprising:

transmitting a signal of a first carrier frequency;

based on a first reflected signal being received, transmitting a signal of a second carrier frequency different from the first carrier frequency, the first reflected signal resulting as the transmitted signal of the first carrier frequency being reflected by a space where the electronic apparatus is disposed;

based on a second reflected signal not being received after the signal of the second carrier frequency is transmitted, determining the second carrier frequency as a search carrier frequency, the second reflected signal resulting as the transmitted signal of the second carrier frequency being reflected by the space where the electronic apparatus is disposed;

transmitting a signal of the determined search carrier frequency; and identifying whether an object is present based on whether a third reflected signal, resulting from the transmitted signal of the determined search carrier frequency, is received after the signal at the determined search carrier frequency is transmitted.

12. The method as claimed in claim 11, wherein the identifying comprises, based on the third reflected signal being received after the signal of the search carrier frequency is transmitted, identifying that the object is present, wherein the third reflected signal includes a signal generated as the signal of the determined search carrier frequency being reflected by the object.

13. The method as claimed in claim 12, wherein the identifying comprises identifying that the object is present based on a difference between a carrier frequency of the third reflected signal and the determined search carrier frequency being equal to or less than a threshold value.

14. The method as claimed in claim 11, further comprising:

based on identifying that the object is present, turning on a microphone; and identifying that the object is a user based on sound received from the turned-on microphone.

15. The method as claimed in claim 14, further comprising:

based on identifying the user while the electronic apparatus operates in a first mode, changing the first mode to a second mode; and displaying a user interface (UI) corresponding to the second mode.

\* \* \* \* \*